Patented Feb. 18, 1947

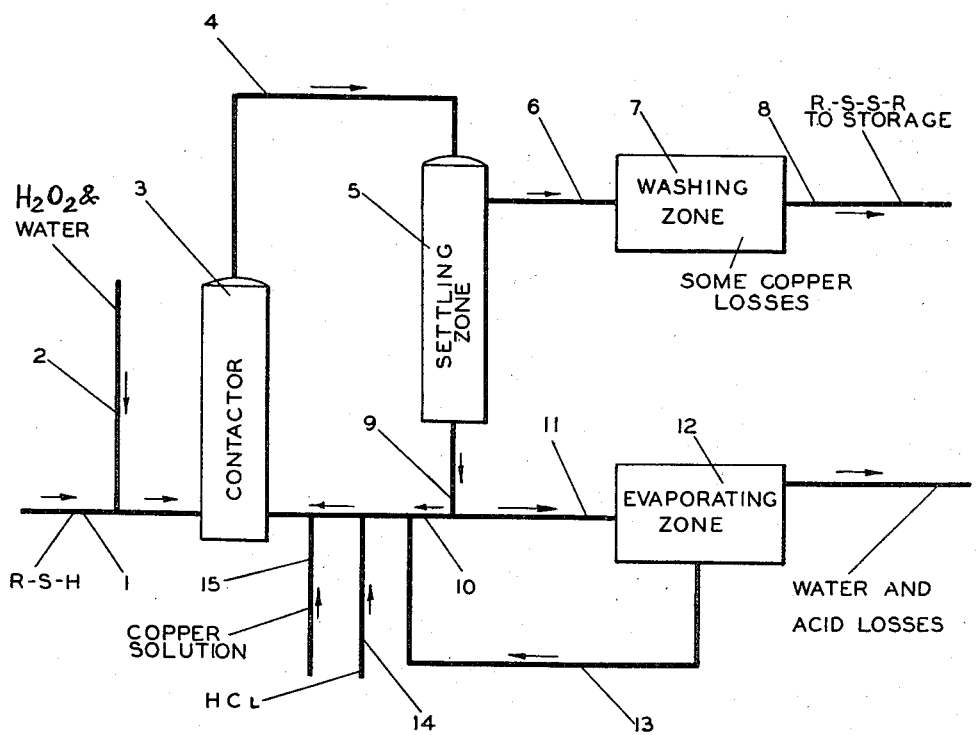

2,415,852

UNITED STATES PATENT OFFICE 2,415,852

HIGH MOLECULAR WEIGHT ORGANIC DISULFIDES

Walter A. Schulze and Willie W. Crouch, Bartlesville, Okla., assignors to Phillips Petroleum Company, a corporation of Delaware Application November 23, 1943, Serial No. 511,432

10 Claims. (Cl. 260—608)

This invention relates to an improved process for the manufacture of organic disulfides of high molecular weight. More specifically the present invention relates to the manufacture of valuable organic disulfides of high molecular weight through the selective oxidation of the corresponding mercaptans. Even more specifically this invention relates to the production of high molecular weight organic disulfides from mercaptans having molecular weights in excess of about 174 by the selective oxidizing action of an aqueous solution of cupric copper ions in the presence of hydrogen peroxide and a relatively high concentration of chloride ions.

The susceptibility of mercaptans to oxidation has been, in the past, presumed to be a well established fact. However, the data available relative to the oxidation of mercaptans to disulfides have been based almost exclusively on alkyl mercaptans of relatively low molecular weight such as those encountered in the so-called sweetening of gasoline and kerosene distillates. It is well known that the lower members of the aliphatic series are readily oxidized to disulfides by a variety of mild oxidizing agents after the equation:

$$2RSH + \tfrac{1}{2}O_2 \rightarrow R\text{—}S\text{—}S\text{—}R + H_2O$$

It is also known that vigorous oxidizing agents result in the formation of sulfonic acids. Thus, treatment of t-amylmercaptan with hydrogen peroxide results in the formation of t-pentanesulfonic acid while conventional sweetening agents such as sodium plumbite and cupric chloride carry the reaction only as far as the disulfide.

We are aware of the existence of an extensive art relative to the conversion of very dilute solutions of mercaptans to disulfides as applied to the sweetening of gasoline, however virtually no information is available on the oxidation of undiluted tertiary mercaptans in the molecular weight range of 174 to about 256 or higher. We have found that mercaptan mixtures containing predominantly tertiary types and having average molecular weights of about 200 to 260 are very resistant to the milder oxidizing agents. Thus, whereas it is known that the low-molecular weight mercaptans such as those found in light gasoline fractions, undergo an appreciable degree of oxidation to disulfides when contacted with air, the high-molecular weight tertiary mercaptans of this invention undergo substantially no oxidation when agitated with pure oxygen for several weeks. We have also observed that tertiary mercaptans, with an average molecular weight of about 210, remain unchanged when treated under conditions of vigorous agitation with a large excess of 30 per cent hydrogen peroxide. It was also found that the mercaptans hereinbefore defined were indifferent to 5 per cent hydrogen peroxide at 150° as well as to ferric chloride at elevated temperatures. Thus, it is apparent that conventional concepts pertaining to the oxidizability of mercaptans to disulfides do not necessarily apply to the higher molecular weight aliphatic mercaptans such as those prepared from tri-isobutylene and similar olefins derived from the catalytic polymerization of light olefin gases.

Conventional gasoline sweetening operations wherein mercaptans are converted to disulfides are not entirely applicable to the production of the high molecular-weight disulfides of this invention. Thus in the copper chloride sweetening process the following theoretical equations may be written.

(1) $4R\text{—}SH + 2CuCl_2 \rightarrow$
$\qquad\qquad\qquad R\text{—}S\text{—}S\text{—}R + 2RSCu + 4HCl$
(2) $2RSCu + 2CuCl_2 \rightarrow R\text{—}S\text{—}S\text{—}R + 4CuCl$ In the case of the tertiary mercaptans of the present process, we have found that Equation 1 above apparently takes place at moderately elevated temperatures, but Equation 2 either does not occur or else it proceeds at a very slow rate in comparison with Equation 1. Attempts to prepare high molecular-weight disulfides by this procedure results in a rapid reduction in oxidation potential due to depletion of cupric ions and the consequent drastic reduction in pH of the solution. An even more undesirable consequence is the contamination of the disulfide product stream with high concentrations of soluble cuprous mercaptide.

We have found that, whereas the high molecular-weight mercaptans hereinbefore described are not affected by hydrogen peroxide, the corresponding cuprous salts are readily oxidized to disulfide and cupric chloride as indicated by the following equation:

$2R\text{—}S\text{—}Cu + 2H_2O_2 + 4HCl \rightarrow$
$\qquad\qquad\qquad R\text{—}S\text{—}S\text{—}R + 2CuCl_2 + 4H_2O$ We have further found that the proper combination of the copper chloride and hydrogen peroxide systems when applied simultaneously result in a smooth and substantially complete conversion of high-boiling tertiary mercaptans to disulfides. Thus the two oxidizing agents, neither of which is adequate alone, mutually complement each other to produce a result which represents a distinct and novel improvement in the art of mercaptan oxidation to the corresponding high molecular-weight disulfides.

An object of the present invention is to provide a process for the direct oxidation of high molecular-weight tertiary mercaptans to their corresponding disulfides.

Another object of the invention is to provide a highly efficient and specific oxidizing system for the conversion of high molecular-weight tertiary mercaptans to disulfides.

A further object of this invention is the provision of a continuous process for the conversion of undiluted, high molecular-weight, tertiary mercaptans to disulfides by means of a novel oxidation system.

A still further object of the invention is to provide a process for the manufacture of high molecular-weight organic disulfides of exceptional value as lubricating oil additives.

In the production of the disulfides of this invention, the oxidation of the high molecular-weight tertiary mercaptans is effected with a solution of cupric copper ions and hydrogen peroxide in the presence of a relatively high concentration of chloride ions. Since concentrated solutions of hydrogen peroxide and cupric chloride cannot coexist in the same solution, the hydrogen peroxide is ordinarily introduced into the oxidizing zone as an emulsion in the mercaptan feed where it coacts along with the cupric ion in accomplishing the desired oxidation to disulfide. In the case of batch operation the hydrogen peroxide is added to an agitated mixture of mercaptan and copper solution at a rate just sufficient to maintain the copper content substantially in the cupric form. The oxidation reaction is most efficiently accomplished at moderate superatmospheric temperatures. In continuous operation provision is made for the removal of excess water from the oxidizing solution in order to maintain optimum cupric copper and chloride ion concentrations. With our preferred oxidizing system, the high molecular weight disulfide products are substantially free of mercaptan and cuprous mercaptides and therefore do not ordinarily require further purification.

Preferred reactants for the present process are alkyl mercaptans having the general formula RSH where R is an alkyl group having 12 to 16 carbon atoms while the preferred products of the process are the high molecular weight alkyl disulfides having the general formula RSSR where R is an alkyl group having from 12 to 16 carbon atoms.

A specific preferred embodiment of the invention is illustrated in the accompanying drawing. A mercaptan feed having an average molecular weight of about 210 and comprised almost completely of tertiary type compounds is withdrawn from storage through line 1 and is emulsified by suitable means with hydrogen peroxide solution from line 2 prior to injection into contactor 3. In continuous operation the contactor contains a major proportion of aqueous cupric chloride solution and a minor proportion of organic sulfur compound. The entering mercaptan is thoroughly contacted with the copper solution while maintaining the temperature between about 120° F. and about 150° F. The product stream and oxidizing solution ordinarily in the form of an unstable emulsion flow via line 4 into settling zone 5. An interface is maintained in the settling zone so that the product disulfide can be continuously withdrawn through line 6 to the washing zone 7 where the product is intimately contacted with water and separated by gravity. The washed product is then pumped to storage via line 8.

The copper solution in settling zone 5 is ordinarily too dilute for direct return to the oxidizing contactor due to the diluting effect of water introduced with the hydrogen peroxide. Consequently a portion of the copper solution in line 9 is pumped via line 11 to evaporation zone 12 where the water content is reduced to a predetermined level by such conventional means as spray ponds, multiple effect evaporators and the like. The concentrated copper solution is withdrawn through line 13 and combined with the dilute stream from line 10. Hydrogen chloride either as a dry gas or aqueous solution is added through line 14 to take care of any acid loss in the evaporation zone. Finally make-up copper solution from line 15 is added to line 13 prior to its entry into the oxidation contactor. In some instances it may be more convenient to subject the entire dilute copper solution to concentration in the evaporation zone, thus eliminating line 10. In either case it is essential that the recycle oxidizing stream be held at or near the optimum concentrations with respect to cupric copper and chloride.

The oxidizing copper solution of this process comprises an aqueous solution of cupric copper in the presence of a chloride ion concentration equivalent to that of a 10 to 20 per cent sodium chloride solution. The cupric copper concentration may vary from about 3 per cent to about 14 per cent although intermediate concentrations of from about 5 to 10 per cent are ordinarily preferred.

The hydrogen peroxide of the oxidizing system of this invention may vary in concentration from about 3 per cent to 30 per cent aqueous stabilized solutions. However, because of the considerable diluent effect on the copper solution and consequent load on the evaporation system, the more concentrated solutions containing from 15 to 30 per cent $H_2O_2$ are preferred. Regardless of the strength of the peroxide solution, it is desirable to have a slight excess of $H_2O_2$ over that called for in a hypothetical direct stoichiometric oxidation of the mercaptan to disulfide. Thus 1.1 times the theoretical weight of $H_2O_2$ has been found adequate although higher concentrations obviously may be employed.

In the preferred continuous-oxidation procedure the volume ratio of copper solution to dry mercaptan charge may vary from 2 to about 10. However, because of the diluent effect of the peroxide solution this ratio is more often maintained between about 4 and 10. The volume of hydrogen peroxide solution introduced with the mercaptan feed is dependent on the concentration of the peroxide. Thus the peroxide solution to mercaptan volume ratio may vary from about 0.25 for concentrations close to 30 per cent to about 2.5 for peroxide dilutions as low as 3 per cent. In general, the volume ratio of $H_2O_2$ to mercaptan is maintained between about 0.05 and 0.10 and preferably about 0.075.

Under optimum conditions with respect to the oxidation potential of the copper solution and in the presence of hydrogen peroxide, the rate of oxidation of the high moleucular-weight mercaptans of this invention is too slow to be of practical value at temperatures below about 120° F. However, at temperatures between about 120° and 150° F., a smooth reaction occurs in most instances. However, in cases involving highly refractory mercaptans reaction temperatures as high as 200° F. may be necessary.

In the oxidation of the tertiary mercaptans of this process a reaction time of from about 10 to 60 minutes may be required. However, in most instances substantially complete conversion of mercaptan to disulfide is realized with reaction times of from 20 to 40 minutes.

Further illustrations of the specific advan-

Example I

A mixture of dodecylmercaptans was converted to the corresponding disulphides through batchwise treatment with cupric chloride solution in the presence of hydrogen peroxide. A 25 ml. sample of mercaptan was agitated for 30 minutes with 60 ml. of copper solution with the continuous addition of 10 per cent hydrogen peroxide. The hydrogen peroxide was added just fast enough to maintain the green color of the oxidizing solution. After separation and washing of the oily product, analysis showed 92.3 per cent conversion of mercaptan to disulfide.

Agitation of the above mercaptan with a large excess of 30 per cent hydrogen peroxide for 60 minutes resulted in no detectable oxidation of the mercaptan. Likewise 5 per cent hydrogen peroxide at 150° F. was not effective as an oxidizing agent with the same mercaptan.

Example II

A mixture of tertiary mercaptan types having from 12 to 14 carbon atoms per molecule was continuously oxidized to the corresponding disulfides. The oxidizing copper solution of this experiment contained 13.5 per cent sodium chloride and 14.8 per cent copper sulfate pentahydrate in water. The hydrogen peroxide solution assayed approximately 29 per cent $H_2O_2$. Approximately 200 ml. of the copper solution was charged to a glass flask fitted with a mechanical stirrer and separating zone for continuous removal of the disulfide. The entire apparatus was immersed in a water bath maintained at 140° F. Mercaptan and hydrogen peroxide were added in a volume ratio of 4:1 at a rate approximately equal to 80 ml. of mercaptan per hour. After building up an aqueous phase to non-aqueous phase volume ratio of about 5, product was continuously withdrawn from the separator at a rate equal to that of the mercaptan charge. The disulfide product thus produced contained less than 2 per cent unreacted mercaptan and was essentially free of copper compounds.

This application is a continuation-in-part of our copending application, Serial No. 511,178, filed November 20, 1943, and entitled "High molecular weight alkyl disulfides."

Having described our invention, we claim:

1. The process of preparing high molecular weight alkyl disulfides having the general formula R—S—S—R where R is an alkyl group having from 12 to 16 carbon atoms which comprises subjecting the corresponding high molecular weight mercaptan to the simultaneous action of aqueous hydrogen peroxide and aqueous cupric chloride, to effect substantially complete conversion of said mercaptan to said disulfide.

2. The process of preparing high molecular weight alkyl disulfides having the general formula R—S—S—R where R is an alkyl group having from 12 to 16 carbon atoms which comprises intimately contacting the corresponding mercaptan having the general formula R—SH where R is an alkyl group having from 12 to 14 carbon atoms with an aqueous phase comprising hydrogen peroxide and cupric chloride and thereby oxidizing said mercaptan to effect substantially complete conversion to said disulfide, separating the resulting reaction mixture into an aqueous phase and an organic phase, and separately withdrawing said phases, said organic phase containing said disulfide as the product of the process.

3. The process of claim 2 including the further steps of evaporating sufficient water from the withdrawn aqueous phase to keep the water content of the system constant and recycling the residual aqueous phase to the process, and adding sufficient HCl to the recycled aqueous phase to maintain the aqueous phase equivalent to a solution of cupric chloride.

4. The process of claim 2 wherein said aqueous phase comprises an aqueous solution in which cupric copper is present in concentration ranging from 3 to 14 per cent and chloride ion is present in concentration equivalent to that of a 10 to 20 per cent sodium chloride solution.

5. The process of claim 2 wherein hydrogen peroxide is present in amount equal to about 1.1 times the amount of hydrogen peroxide which is stoichiometrically equivalent to the mercaptan.

6. The process of claim 2 wherein the cupric copper is present in said aqueous phase in amount such as to give a concentration ranging from 3 to 14 per cent and chloride ion is present in concentration equivalent to that of a 10 to 20 per cent sodium chloride solution, wherein the volume ratio of cupric chloride solution to dry mercaptan feed ranges between 4 and 10, and wherein the volume ratio of $H_2O_2$ to mercaptan is between about 0.05 and 0.10.

7. The process of claim 2 wherein the oxidation reaction is conducted at a temperature of at least 120° F.

8. The process of claim 2 wherein said mercaptan is a tertiary mercaptan.

9. A continuous process for the conversion of high molecular weight mercaptans having a molecular weight in excess of about 174 to the corresponding disulfides comprising mixing an aqueous solution of hydrogen peroxide with a feed containing said mercaptans, contacting the resulting mixture with an aqueous cupric chloride solution to form the corresponding disulfides, separating out the disulfides, and concentrating said aqueous solution of cupric chloride by the removal of water to condition said cupric chloride solution for reuse in the process.

10. A process according to claim 1 wherein the high molecular weight mercaptan is a tertiary mercaptan.

WALTER A. SCHULZE.
WILLIE W. CROUCH.

REFERENCES CITED

The following references are of record in the file of this patent:

UNITED STATES PATENTS

| Number | Name | Date |
|---|---|---|
| 2,150,656 | Lounsbury | Mar. 14, 1939 |
| 2,094,485 | Buell | Sept. 28, 1937 |
| Re. 20,938 | Hoover (1) | Dec. 6, 1938 |
| 2,042,953 | Hoover (2) | May 26, 1936 |
| 2,297,650 | Fry | Sept. 29, 1942 |
| 2,163,312 | Schulze | June 20, 1939 |
| 2,058,720 | Reid et al. | Oct. 27, 1936 |

OTHER REFERENCES

Kalichevsky & Stagner, "Chemical Refining of Petroleum," 2d edition 1942; Reinhold, New York, N. Y., publishers.